United States Patent [19]

Kofflin

[11] Patent Number: 5,355,917
[45] Date of Patent: Oct. 18, 1994

[54] PRE-CONDITIONED AIR ADAPTER CHUTE

[76] Inventor: David F. Kofflin, 9801 Dupont Ave. S., Bloomington, Minn. 55431

[21] Appl. No.: 95,562

[22] Filed: Jul. 19, 1993

[51] Int. Cl.⁵ .................................. B65B 1/30
[52] U.S. Cl. .................... 141/384; 141/387; 141/312; 141/113; 141/391; 193/3
[58] Field of Search ............... 141/387, 389, 391, 312, 141/383, 113, 384; 193/3; 244/118.5; 903/321

[56] References Cited

U.S. PATENT DOCUMENTS

| | | | |
|---|---|---|---|
| 2,665,926 | 1/1954 | Fraser | 141/384 UX |
| 2,680,030 | 6/1954 | Hoelzer | 141/384 UX |
| 2,729,471 | 1/1956 | Fraser | 141/384 UX |
| 2,737,401 | 3/1956 | Lindsay | 141/384 UX |
| 3,045,721 | 7/1962 | Shepherd et al. | 141/389 X |
| 3,055,405 | 9/1962 | Pase | 141/384 UX |
| 3,086,565 | 4/1963 | Mosher | 141/384 |
| 3,330,313 | 7/1967 | Rosell | 141/384 |
| 3,825,212 | 7/1974 | Danges et al. | 244/118.5 |
| 5,058,636 | 10/1991 | Simmel | 141/387 X |
| 5,299,763 | 4/1994 | Bescoby et al. | 244/118.5 |

Primary Examiner—Ernest G. Cusick
Attorney, Agent, or Firm—Thomas B. Tate

[57] ABSTRACT

A pre-conditioned air adapter chute for attachment to an aircraft. The chute has a body which is cylindrical at the top and the bottom, handles on either side of the body, a clamp attached to each of the handles, and a hook attached to each of the clamps.

1 Claim, 2 Drawing Sheets

PRE-CONDITIONED AIR ADAPTER CHUTE

SUMMARY AND BACKGROUND OF THE INVENTION

Airline ground crews use a pre-conditioned air adapter chute, also known as a ground air connector, to connect a pre-conditioned air unit on the ground to the aircraft it services. The type of chute currently in use in made of metal, is cone-shaped, has no handles, and has a bar-type clamp.

The present invention is made of a plastic material such as high-density polyethylene, has a shape that is conical at the bottom and cylindrical at the top, has handles, heavy duty clamps, and Teflon hooks at the top.

Advantages of the present invention over the prior art are that it is lighter weight, less bulky, and more durable, does not rust, dent, or chip, and because of the Teflon hooks, it can be adjusted easily without damaging the aircraft.

DESCRIPTION OF THE INVENTION

Figure 1:
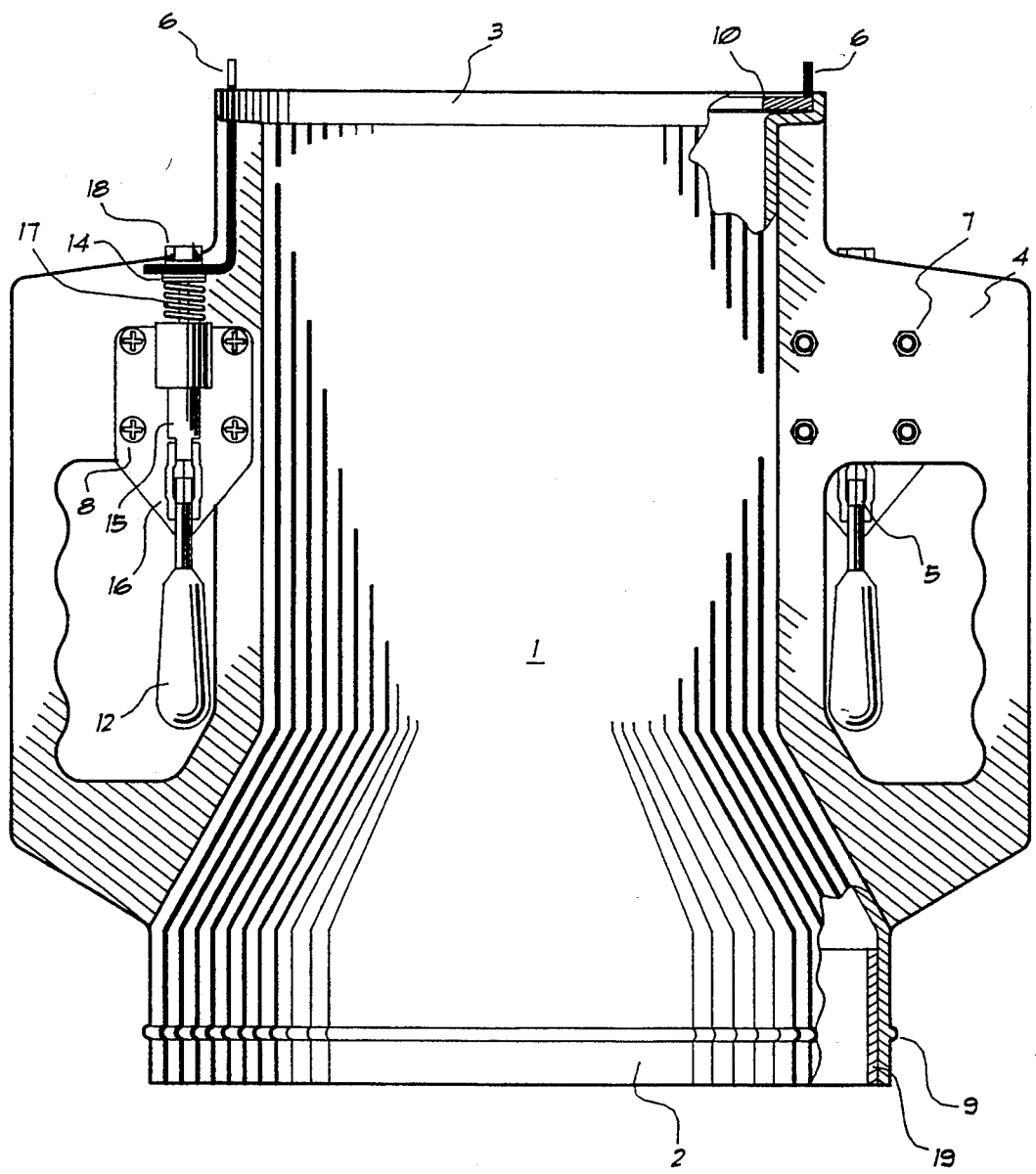
FIG. 1 is a front view, with cutaways to show the inner ring material and the gasket.
Figure 2:
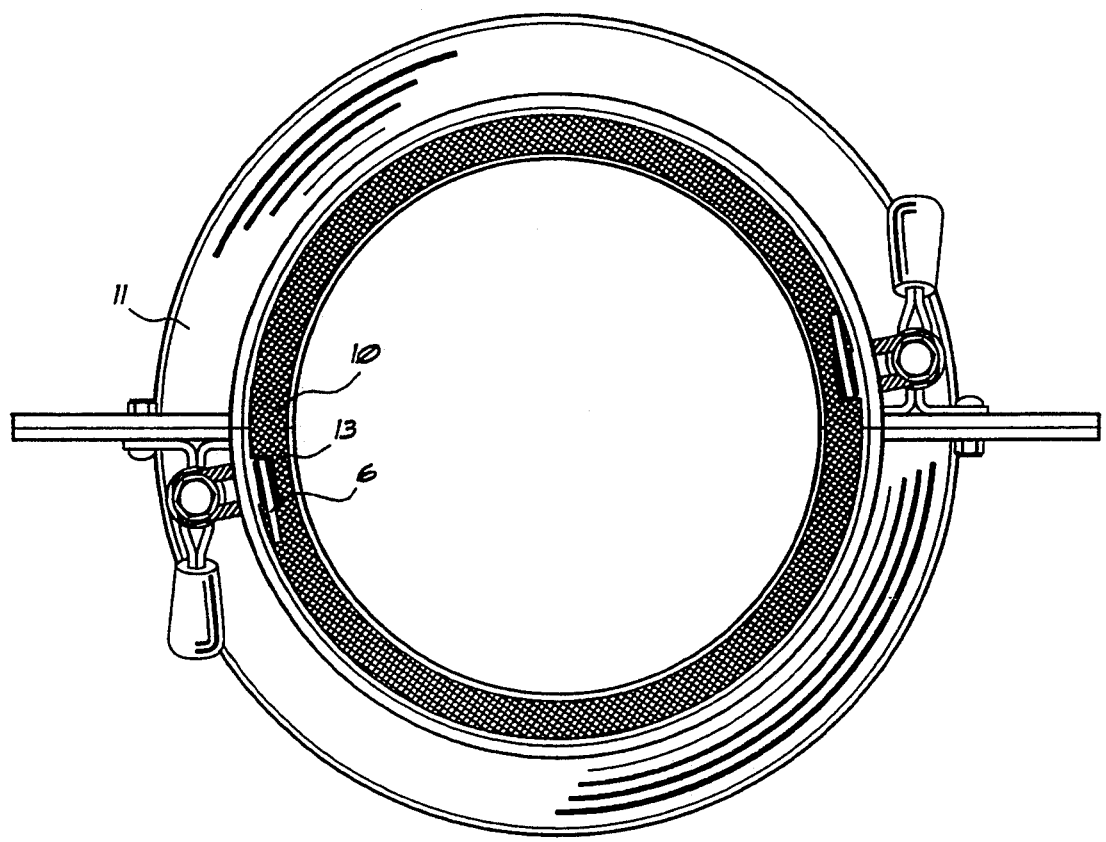
FIG. 2 is a top view.

The adapter chute has a body 1 which is hollow and which has a cylindrical upper or snout end 3 and a conical lower or bell end 2. The body 1 is made of plastic material such as polyethylene. The bellend 2 has a bead 9 running around its circumference to form a collar. An inner reinforcing ring 19 of polyethylene material circles the inside of bell end 2. By attaching the snout end 3 onto the aircraft and the bell end 2 to an air hose of a pre-conditioned air unit on the ground, the entire adapter body 1 is used as the connector necessary to promote the exchange of air between the pre-conditioned air unit and the aircraft.

A handle 4 is attached to either side of the body 1. A clamp 5 is mounted on each of the handles 4. The clamps 5, which are a commercially available type known as a Destaco 609, each comprises a plastic-coated clamp handle 12, rod 15 with a spring 17, clamp plate 16, washers 14, nuts 7, bolts 8, and cap screws 18. Each clamp 5 has attached to its top end a Teflon hook 6 which is right-angled in shape, horizontal at the bottom and vertical at the top.

The snout end 3 has an inside rim 11. A neoprene gasket 10 fits around the inside of the rim 11. A notch or slot 13 is formed in gasket 10 on either side in order to allow the hooks 6 to pass therethrough.

The clamp handles 12 can be moved in an up and down fashion, which in turn move the rods 15, which in turn move the hooks 6 and up and down in order to adjust the adapter body 1 and securely attach the body 1 to the aircraft.

I claim:

1. A pre-conditioned air adapter chute wherein said chute is adapted to connect an aircraft to a pre-conditioned air unit located on the ground, said adapter chute comprising:

an adapter body comprised of plastic material, said body being hollow and having a generally cylindrical top end and a flared, generally conical bottom end, said top end defining an inner rim which is provided with a gasket having openings defined therethrough, said top end being adapted for attachment to said aircraft and said bottom end being adapted for attachment to said pre-conditioned air unit;

a pair of handles disposed vertically along opposite sides of said adapter body;

clamp means mounted onto each of said handle, each of said clamp means including a vertical rod attached to a clamp handle so that moving said clamp handle up and down also moves said rod up and down;

a hook attached to each of said clamp means, each of said hooks being right-angled in shaped, having a horizontal bottom piece which is attached to the top end of its respective clamp means and a vertical top piece which projects through one of said openings in said gasket, each of said hooks being adapted to move up and down with the up and down motion of its respective clamp means in order to adjust the position of said adapter chute in connection to said aircraft.

* * * * *